INVENTOR.
THOMAS ROY THOMAS
BY Brown, Jackson, Boettcher & Dienner
ATTYS.

INVENTOR.
THOMAS ROY THOMAS
BY Brown Jackson Boettcher & Dienner
ATTYS.

3,400,317

CONTROL SYSTEM FOR PROVIDING AND MAINTAINING RELATIVE POSITION OF TWO TAPE MEMBERS

Thomas Roy Thomas, Springfield, Ill., assignor to Sangamo Electric Company, Springfield, Ill., a corporation of Delaware Filed July 28, 1964, Ser. No. 385,723
16 Claims. (Cl. 318—314)

ABSTRACT OF THE DISCLOSURE

A system for time framing the output of two or more magnetic tapes, or sections thereof, without opening of the tape servo loop, which includes a fast response electronic tape speed servo control with low inertia capstan drive for each tape, and positioning means which compare position indicating signals on each tape to provide an error signal indicating the difference in the positions of the two tapes. The position error signal is fed to control means in the tape servo control for the first tape which reacts to such signal as if the drive of its tape has changed speed and automatically adjusts the driving speed by an amount determined by the value of the position signal. If the signals indicate the first tape lags the second tape, the position error signals fed to the control means for the servo cause the servo to react as if the speed of the first tape has decreased and the servo thereupon increases the speed of the drive for the first tape to reestablish the relative positions of the two tapes.

Figure 1:
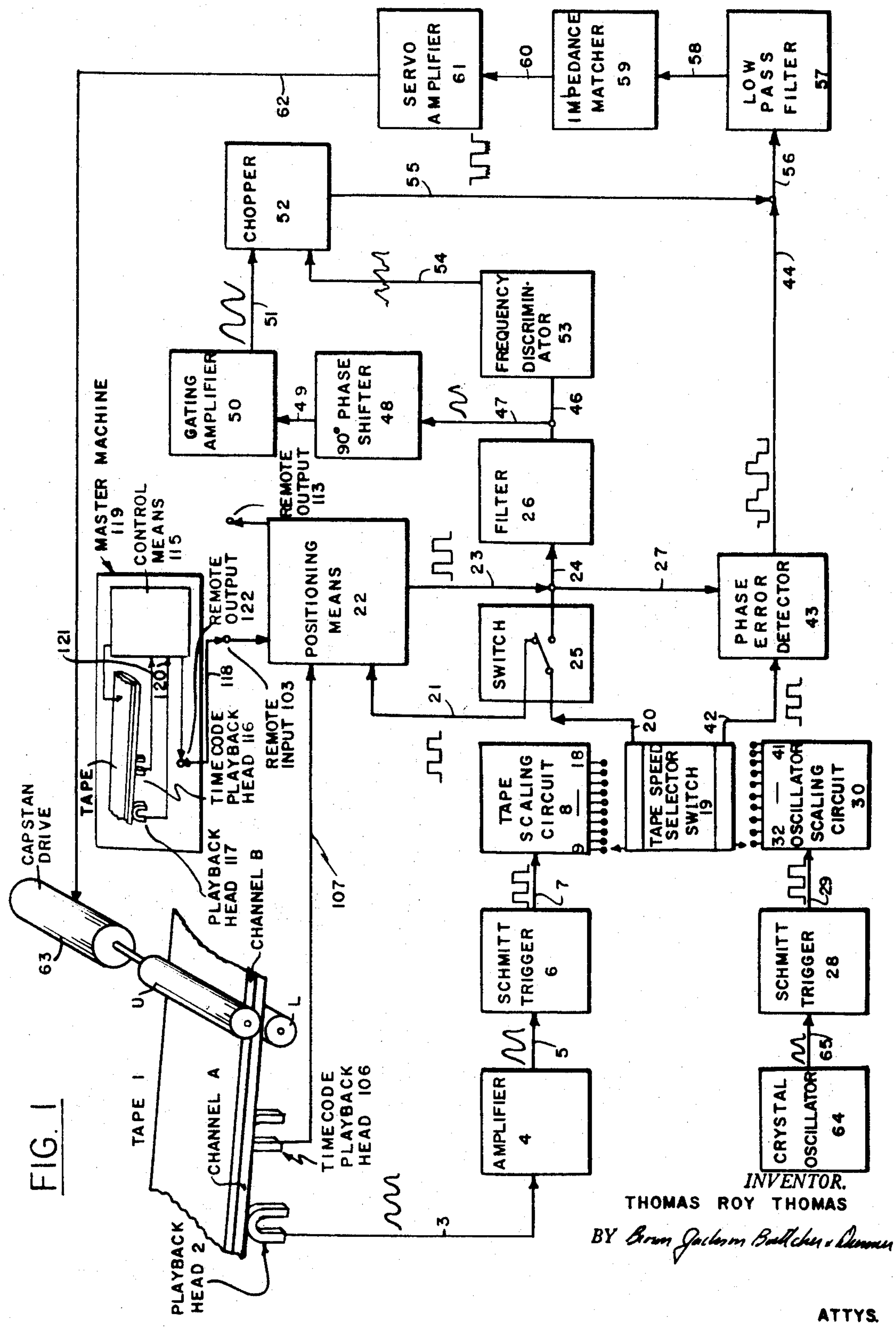

This invention relates to speed synchronizing devices, and more particularly to a novel means for rapidly and accurately adjusting the relative position of two or more driven members while maintaining speed synchronization. The invention is particularly useful in tape recorder time framing where a number of tapes must be recorded and played back on different machines at the same time. The tapes must not only operate at the exact speed at which they were recorded, but must also maintain an exact position and time relationship with each other.

Speed synchronization is an important factor, particularly in FM-FM telemetry recording and wideband FM recording where the accuracy of the magnetic tape system directly depends on the ability of the tape machine to play back tapes at the same speed at which they were recorded.

Conventional tape systems have commonly employed massive flywheels and large drive motors to achieve speed synchronization. This method is not only inefficient but usually cannot correct for a deviation between the recording and play-back speed of more than ±2.5 percent.

The present novel system for speed and position synchronization utilizes a very low inertia capstan drive with a fast-response electronic tape speed servo control. This allows the servo system to respond to speed errors more rapidly than most previously known systems and to correct for speed deviations of up to ±15 percent without loss of synchronization.

While speed synchronization alone insures that recorded signals will be accurately reproduced when one tape and one machine are used, it does not guarantee accurate reproduction when two tapes and two machines are used at the same time. That is, although tape recorder units are now available which provide as many as fourteen separate channels on a tape in certain applications, even these units do not have sufficient capacity to accept the information to be stored, and in such instances the information must be recorded on two ore more tapes on two or more machines.

It is evident that whenever two tapes on two machines must be recorded at the same time, the tapes must be positioned on the playback machines so that information placed simultaneously on each tape by the record heads will also pass under the playback heads simultaneously.

Such manner of operation poses a problem. That is, when the two playback machines are loaded and started, the tapes will not normally be in the same relative position as during recording, and it is therefore necessary to establish such relative position during movement of the tape to insure proper reproduction. Basically, such synchronization may be effected by operating one tape above its correct speed or the other below its correct speed until the two tapes are properly positioned relative to each other, and different devices have been provided heretofore which attempt to solve the problem in this manner.

In one prior art type of machine, for example, a synchronizing servo system including a feedback loop is used to obtain speed synchronization, and in such arrangement rapid time framing is effected by disconnecting or over-riding the feedback loop while the tape is accelerating or decelerating. However, once the servo feedback loop is disconnected, it is difficult to reestablish proper speed synchronization and the system tends to be unstable, particularly during the transition state. In other known prior art systems, the frequency of the reference oscillator in the speed synchronizing servo system is adjusted to achieve the desired position and time relationship. Although such method leaves the feedback loop intact, only about a one percent increase or decrease in tape speed is allowed before the servo system begins to reestablish normal speed. This solution is slow, and requires a variable frequency oscillator which is inherently less accurate than a system in which a single frequency oscillator is used. Also, presumably one would have to switch from the variable oscillator to the common fixed oscillator for maximum effectiveness.

It is an object of the present invention, therefore, to provide a novel system which includes means for indicating the exact speed and relative position at which two or more driven members were previously operated, and means for more accurately and rapidly adjusting the drive of the two members at the same speed and relative position in a subsequent operation.

It is a specific object to provide a novel system for effecting such positioning under a normal closed loop speed synchronizing condition, in which the feedback loop which energizes the capstan drive remains closed at all times and the reference oscillator frequency remains constant.

It is a further object of this invention to provide a rapid and accurate means for establishing a predetermined position and time correspondence between a number of driven members which are being driven by a speed synchronizing means without losing speed synchronization.

It is yet another object of this invention to provide novel means for establishing a predetermined, exact position and time relationship between a master tape member and one or more slave tape members in such type system including means for controlling the speed synchronizing means in effecting the change of the position of the slave tape members relative to the master tape member.

It is a further object of the present invention to provide a novel type system for establishing a predetermined speed for a driven member, and a predetermined position of said driven member relative to a given speed and position reference, including novel position control means operative in combination with novel speed control means to effect operation of the tapes at the same speed and relative position during playback.

It is an object of the present invention to provide a novel system of such type which includes means for positioning the member by providing an error signal to the speed control means to simulate a change in speed of the driven member, whereby said control means adjusts the driving speed and thereby the relative position of the driven member.

Figure 2:
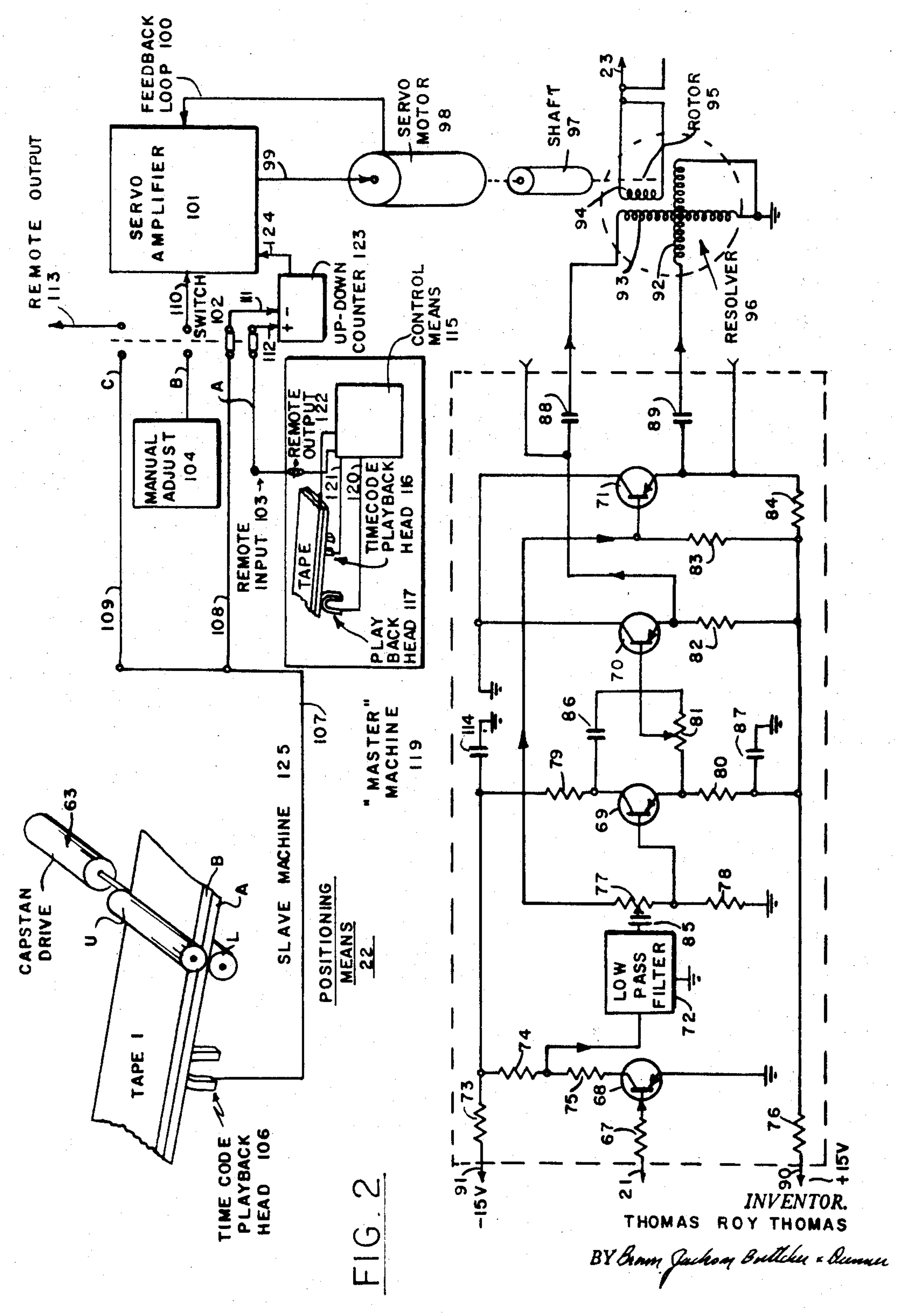

These and other objects, features and advantages of the present invention will become apparent with reference to the following specification and accompanying drawings in which basic embodiments of the structure are illustrated, and in which:

FIGURE 1 comprises a block diagram of the novel type recorder system including the speed and position control circuitry; and FIGURE 2 sets forth the specific circuit diagram for the novel positioning means of the invention.

*General description*

The manner in which speed and position synchronization and control of two driven type members is achieved in one novel embodiment of the invention is now briefly set forth. In achieving speed synchronization, a speed reference signal or frequency obtained from a stable oscillator is recorded on a tape channel at the same time information is recorded on others of the tape channels. During playback, the recorded tape speed reference signal, which may be any one of ten frequencies depending on tape speed, is amplified and applied to a Schmitt trigger circuit, which changes the tape speed reference signal from a sine wave to a square wave of the same frequency. The resultant square wave is then applied to a scaling circuit which divides the frequency a suitable number of times to provide a constant frequency output (in one embodiment .78 kc. or .39 kc.). At this time, the signal is processed in two separate channels. The first channel produces a positive or negative error signal by continuously comparing the phase of the divided tape speed reference signal with the phase of a signal from a reference crystal oscillator which has also been changed to a square wave by a Schmitt trigger circuit and divided by an oscillator scaling circuit to provide a constant .78 kc. or .39 kc. output.

The second channel produces an initial error signal by changing the input square wave signal from the tape scaling circuit to a sine wave and continuously comparing the frequency of the divided tape speed signal with the reference frequency defined by passive circuit elements, such as a Wein bridge. The initial error signal is then changed to a positive or negative signal by admitting the signal to a chopper controlled by a gating signal shifted ninety degrees in phase from the divided tape speed signal.

The positive or negative error signals from each channel are mixed, filtered to a varying D-C signal, and impedance matched to a servo system for controlling the capstan tape drive which restores proper tape speed.

As noted above, proper positioning of the tapes is achieved in the present system by providing a novel positioning means which works in combination with the speed control circuitry to effect rapid and accurate positioning of the several tape members. In achieving such control a timing code reference comprising a plurality of pulses is recorded on one channel of each tape at the tame time information is being recorded on one or more of the other tape channels. During playback, the code reference pulses from one of the plurality of tape machines being operated simultaneously (i.e., the "Master" machine) is fed to an up-down counter in each of the other tape machines (i.e., the "Slave" machines) along with the pulses on the tape associated with the slave machine. The counter then compares the number of time code pulses received from the master machine tape with the number of time code pulses received from its own "Slave" tape, and automatically adjusts the position of the tapes to a desired relation. As will become apparent, any one of the machines operated may be designated as the master machine and have its time code fed to each of the other slave machines.

The positioning means in each lsave machine includes a servo system for controlling a frequency changer which works with the speed synchronizing circuitry to adjust the slave tape to the original relative position with the master tape. The positioning means including the frequency changer is located at the beginning of the frequency and phase error channels to the speed synchronizing circuitry. Thus, if the positioning means are enabled, the speed reference signal as recovered from each tape and counted down to a .78 kc or .39 kc in the tape scaling circuit, must pass through the positioning means before it enters the frequency error and phase error channels.

If the positioner is not operating, it has no effect on the system and speed synchronization proceeds as previously described. If, however, the positioning means detect an error in the relative position of the master and slave tapes, the associated frequency changer means are operated to either increase or decrease the signal frequency received from the scaling circuit before it enters the frequency and phase error channels.

If, for example, the positioning means detects that the slave tape is positioned ahead of the master tape, the positioning means will attempt to lower the speed of the slave tape until the master tape catches up with it. In the disclosed embodiment, the associated servo is controlled to tune the frequency changer so that the signal frequency from the scaling circuit is increased before transmission to the frequency and phase error channels. It then appears to both error channels that the slave tape has increased speed, and it will try to restore what appears to be the former slower speed of the tape. An error signal is sent to the capstan drive which results in a decrease in the slave tape speed and the lower speed is maintained until the master and slave tapes are in proper relative positions. The frequency changer is then returned to the neutral position by the frequency changer servo and normal speed synchronization is automatically restored.

*Specific description*

With reference now to FIGURE 1, the system is one preferred embodiment is shown to include a tape 1 which is driven over a playback head 2 by a capstan drive 63 including a pair of roller drive member U, L. A tape speed reference signal recorded on channel A is read out by playback head 2 with movement of the tape thereover and transmitted over conductor 3 to voltage amplifier 4. The tape speed reference signal in the disclosed embodiment comprises a sine wave signal of one of ten frequencies extending over a range from .39 kc. to 400 kc. depending on the tape speed selected and the recording oscillator frequency used. (A 200 kc. oscillator is normally used for low density tape over ten discrete speed ranges of from 120 to $^{15}/_{64}$ inches per second.) In the specific embodiment herein disclosed a 400 kc. oscillator is used to record a tape speed reference frequency on high density tape. The corresponding reference frequencies for the noted speeds range from 400 kc. to .78 kc.

The sine wave tape speed signal on channel A is amplified in amplifier 4 and transmitted over conductor 5 to a Schmitt trigger circuit 6 which converts the amplified sine wave to a square wave of the same frequency. Scaling circuit 8 connected to Schmitt trigger 6 by path 7 divides the frequency of the speed reference signal in half ten times by using flip-flops in each of ten consecutive stages. The scaling circuit 8 at its terminals 9–18 thus provides ten different frequencies which range from $^{1}/_{4}$ to $^{1}/_{512}$ of the input frequency. An associated tape speed selector switch 19 may be adjusted to select any one of the signal outputs. When the desired playback speed is selected, the output with approximately a .78 kc. signal at such speed is automatically connected to output circuit 20 of tape speed selector switch 19. The output signals selected by the tape speed selector switch 19 are transmitted over path 20 to switch 25 and over path 21 to the positioning means 22.

Switch 25 is closed to the filter 26 if the tape recorder is used to provide readout of a single tape. However, whenever the relative position of two tapes is to be adjusted, switch 25 is operated to the position shown in FIGURE 1. In use, positioning means 22 is operative to increase or decrease the frequency of the signal output from scaling circuit 8 within certain limits and thereby, as will be explained in connection with FIGURE 2, is operative to effect position adjustment of the tape member. As will be shown, the positioning means 22 may be manually adjusted or may be controlled by a time code signal on channel B of tape 1 which is detected by a playback head 106 and transmitted to one input circuit of positioning means 22.

The output of positioning means 22 is fed over two channels. The first channel includes means for detecting frequency differences between the recorded signal and a predetermined reference frequency comprising a filter 26, a frequency discriminator 53, a ninety degree phase shifter 48, a gating amplifier 50, and a chopper 52. The second channel includes means for detecting phase errors between the recorded signal and a reference signal comprising a crystal oscillator 64, a Schmitt trigger 28, an oscillator scaling circuit 30, selector switch 19 and a phase error detector 43.

In the present embodiment oscillator 64 in the phase error channel comprises a 400 kc. oscillator having its output connected over path 65 to Schmitt trigger circuit 28. Schmitt trigger 28 changes the oscillator output from a sine wave to a square wave of the same frequency.

The output of Schmitt trigger 28 is connected over path 29 to oscillator scaling circuit 30 which divides the input frequency in half ten times in ten successive flip-flop stages. The ten frequencies appearing at outputs 32–41 range from $\frac{1}{4}$ to $\frac{1}{512}$ of the input oscillator frequency. The square wave output from scaling circuit 30 selected by tape speed selector switch 19 and extended over path 42 will be at the same frequency for any playback speed selected (.78 kc. or .39 kc.). Further, the signal extended over path 42 will have the same frequency as the signal extended over path 20 whenever the speed of the tape is at the selected value.

The selected output signals from scaling circuit 30 are connected over path 42 to one input of phase error detector 43. The output of positioning means 22 is connected over paths 23, 27 to a second input for phase error detector 43. As will be shown, any slight tape speed deviation sufficient to shift phase up to ±ninety degrees will cause the phase error detector 43 to produce an increasing plus or minus D-C error signal. When the tape speed increases, the error signal has a positive D-C component, and when the tape speed decreases, the component is negative. When speed deviations are large, the phase error signal is outside the band pass limits of the system and only the error signal from the frequency error channel returns the tape speed to near synchronism. During this period the phase error will be varying from full positive to negative at the nominal rate of the frequency error. When speed deviation becomes small enough, phase error detector 43 immediately provides precise synchronization of the reference and tape speed signals. When synchronism is achieved, the frequency error must average zero. The system is said to be frequency damped, since frequency is the derivative of phase. However, the frequency channel will give a varying output as the frequency tends to change even though the system is phase locked.

Phase error detector 43 comprises a chopper amplifier (not shown) gated by the signal output of the positioning means 22 which blocks or passes the signal from oscillator scaling circuit 30 depending on the phase of the two input signals. The output of the phase error detector 43 is mixed with the output of the frequency error channel as will now be shown.

The signal output of the positioning means 22 is also connected over path 23, 24 to the frequency error channel which includes filter 26 for changing the input square wave to a sine wave of the same frequency. The output of filter 26 is then processed over two branch paths. The first branch path includes a frequency discriminator 53, such as a Wein bridge, for producing an initial error signal, and the second branch path includes a ninety degree phase shifter 48 and a gating amplifier 50 which provides a gating signal to one input circuit of a chopper 52. The output of frequency discriminator 53 is transmitted over path 54 to a second input on chopper 52 which changes the initial error signal from the frequency discriminator 53 into a plus or minus D-C signal.

In the first branch, frequency discriminator 53 measures the difference in frequency between the divided speed reference signal and a reference frequency defined by passive elements. In one specific embodiment, a Wein bridge (not shown) is used to produce the error signal which is amplified by suitable transistor amplifier stages (not shown). The error signal output of frequency discriminator 53 varies from the input in amplitude and phase. If the input frequency is at the null frequency of the Wein bridge, the output signal is zero except for negligible harmonics. As the input frequency increases, a signal appears at the output increasing an amplitude and phase-leading the input. Conversely, if the input frequency decreases, amplitude still increases but the output phase-lags the input. As noted above, such output is connected over path 54 to one input frequency to chopper 52.

In the second branch path the output of filter 26 is connected over paths 46, 47 to ninety degree phase shifter 48 in which the input signal is shifted exactly ninety degrees in phase by a resistive-capacitive network (not shown) and amplified by two conventional transistor stages (not shown). The output of ninety degree phase shifter 48 is extended over path 49 to gating amplifier 50 which increases and impedance matches the signal to a second input circuit for chopper 52.

Chopper 52 basically comprises a chopper amplifier transistor (not shown) in which the base of the transistor is connected to path 51 to receive the ninety degree phase shifted signal and the collector is connected to path 54 to receive the error signal from frequency discriminator 53. The resultant output signal of the chopper 52 has a D-C component whose amplitude and polarity are determined by the amplitude and phase relationship of the error signal and the ninety degree phase shifted signal. The result is to change the polarity of the signal as it goes through the zero frequency.

In the remaining circuitry, signals received over paths 44, 55 from both the frequency and phase error channels are mixed, filtered, and amplified in order to operate capstan drive 63. That is, the input circuit of low pass filter 57 is connected to the output of phase error detector 43 over paths 44, 56 and to the output of chopper 52 over paths 55 and 56. The filter in the present embodiment has a cutoff frequency of 100 cycles per second and is used to pass the D-C components and attenuate the high frequencies of each error channel.

The output of low pass filter 57 is connected over path 58 to impedance matcher 59 which matches the impedance of low pass filter 57 to serve amplifier 61 which is connected to said impedance matcher over path 60. Impedance matcher 59 may comprise three emitter follower stages connected in series.

Servo amplifier 61 increases the strength of the D C error signal and extends the resultant signal over path 62 to capstan drive.

Capstan drive 63 is powered by three D-C motors having linear torque-speed characteristics. The motors are directly geared to a drive shaft which is coupled to a very light flywheel through resilient coupling. An eddy-current drag disc, the edge of which passes between the poles of two electromagnets is mounted on the flywheel. Drag on the disc is provided as a function of exciting current in associated magnet coils, and by varying coil current, capstan speed can be increased or decreased smoothly and rapidly over a wide range. Drag magnet excitation which controls the capstan speed in the embodiment shown is derived from the servo amplifier 61.

The manner of operation of the speed synchronizing circuitry will now be described.

*Operation of speed synchronizing circuitry*

If the tape is operating during playback at the same speed as during recording (as for example, at 60 i.p.s.) the tape speed signal on tape 1 and the oscillator 64 reference signal will be exactly in phase and have the same frequency. The frequency and phase error channels will detect no errors and the input to capstan drive 63 will be zero. Thus no change in tape speed will be necessary, and none is provided.

Now, assuming that the tape begins to move slightly faster (as for example 61 i.p.s.) than during recording, the tape speed signal frequency detected by playback head 2 will tend to increase. Such signal is amplified in amplifier 4 and is impressed on the input of Schmitt trigger 6. As a result Schmitt trigger 6, puts out pulses at a faster rate corresponding to the increase in the tape speed signal frequency. Tape scaling circuit 8 divides the increased frequency by halves 10 times, but the output frequency of switch 19 is now slightly higher than .78 kc.

Assuming switch 25 is closed to connect the output of selector switch 19 to the filter 26 and phase error detector 43, or that positioning means 22 is not operating (as will be explained later) the signal passes unaltered to the frequency and phase error channels.

In the phase error channel, crystal oscillator 64 continues to operate at 400 kc. although the tape speed has increased. Schmitt trigger 28 converts the reference 400 kc. sine wave from oscillator 64 to a 400 kc. square wave, and oscillator scaling circuit 30 divides the square wave reference signal frequency as noted above to provide a .78 kc. signal to phase error detector 43.

Since tape speed tends to increase, the phase of the divided tape speed signal appears to lead the phase of the divided oscillator reference signal by a corresponding value, and the output of the phase error detector 43 over path 44 is an increasing positive D-C component.

In the frequency error channel, filter 26 converts the divided tape speed signal to a sine wave. The signal then follows two branches. In the first branch, frequency discriminator 53 senses that the tape speed signal frequency is higher than the predetermined frequency defined by the Wein bridge circuit, and puts out an initial error signal which is increased in amplitude and leads the input signal in phase. In the second branch, the sine wave output of filter 26 is shifted exactly ninety degrees in phase by ninety degree phase shifter 48 and is increased in amplitude by gating amplifier 50. The output of gating amplifier 50 is impressed on the base of the amplifier chopper transistor in chopper 52, and the output of frequency discriminator 53 is impressd on the collector of the same transistor. Since the tape speed is slightly faster than it should be, chopper 52 will put out a signal over 55 with a positive D-C component.

The error signals from both channels are then joined in low pass filter 57 which removes high frequencies and passes the D-C components. Impedance matcher 59 matches the output of low pass filter 57 with the input of servo amplifier 61. Servo amplifier increases the positive D-C error signal and causes current to flow in the eddy-current drag disk of capstan drive 63, which slows the drive of the tape speed until it again is operating at the same speed as during recording.

In a like manner, if the tape moves slightly slower than exact recording speed during playback, the speed synchronizing circuitry restores true recording speed. In this case the tape speed signal appears to lag the oscillator reference signal in phase and phase error detector 43 produces an error signal with a negative D-C component. Tape speed signal frequency is lower than the predetermined Wein bridge frequency, and frequency discriminator 53 produces an initial error signal which is increased in amplitude and lags the tape speed signal frequency in phase. Chopper 52 puts out an error signal with a negative D-C component. Servo amplifier 61 increases the negative D-C error signal and applies it to the eddy current drag disk which increases the speed of the tape drive until the tape is once more operating at the recording speed again.

*Tape positioning means*

The circuitry for the novel means which are used to control exact positioning of two or more driven members while yet retaining speed synchronization is set forth in FIGURE 2. Such novel manner of control is achieved by using novel positioning means which adjust the speed synchronizing system to control the driven members in a new and novel manner. As shown in FIGURE 2, there is connected between an input path 21 and an output path 23, a switch impedance matcher transistor 68, a low pass filter 72, a phase shifter transistor 69, two emitter follower amplifying transistors 70 and 71, and a resolver 96. Positioning means 22 which modify the signals on such path comprise the resolver 26 including shaft 97, servo motor 98, servo amplifier 101, a switch 102, feedback loop 100, manual adjust 104, remote input 103, channel B on tape 1, playback head 106, and up-down counter 123. It will be apparent that the path extending over input conductor 21 and the box shown as positioning means 22 (FIGURE 1) to the output conductor 23 in effect comprises an alternative input path from the selector switch 19 to the control means 26, 43, etc., for the tape drive, and that, as more fully shown in FIGURE 2, the output of the resolver 96 in the positioning means 22 is coupled to the control means with the signals which are fed to such path by selector switch 19.

The input path 21 accepts the tape speed signal as output from tape scaling circuit 8 and switch 19 (FIGURE 1) for transmission over resistor 67 to the base of amplifying and impedance matching transistor 68. Transistor 68 includes an emitter element connected directly to ground, and a collector connected over resistors 74, 75, and decoupling resistor 73 to the negative supply voltage 91 (—15 volts in the present example). Transistor 68 acts as a pulse amplifier and matches the output impedance of scaling circuit 8 to the input impedance of filter 72.

The input circuit of low pass filter 72 is connected between resistors 74 and 75, and the signal output of transistor 68 as passed over filter 72 is converted from a square wave signal into a sine wave of the same frequency.

The output side of filter 72 is connected over a coupling capacitor 85 and potentiometer 77, the sine wave output of filter 72, as extended over potentiometer 77 being further transmitted over a first path including current amplifying transistor 71 and resolver winding 92, and a second path including phase shifting transistor 69, current amplifying transistor 70, and resolver winding 93.

In the second phase shifting branch, the base of transistor 69 is connected between potentiometer 77 and resistor 78. The emitter of transistor 69 is connected through resistors 76 and 80 to a positive voltage supply 90 (+15 volts in the present example), to the base of current amplifying transistor 70 through adjustable potentiometer 81, and to ground through decoupling capacitor 87. The collector of transistor 69 is connected through resistors 73 and 79 to negative supply 91 and is connected to the base of amplifying transistor 70 through capacitor 86, capacitor 114 is connected between resistor 79 and ground. Potentiometer 81 and capacitor 86 shift the phase of the signal on the collector of transistor 69 ninety degrees. When potentiometer 81 is adjusted properly, the signal on the base of amplifying transistor 70 is shifted exactly ninety degrees in phase relative to the signal on the base of phase shifting transistor 69.

The emitter of transistor 70 is connected through resistors 76 and 82 to supply 90 and is connected over coupling capacitor 88 and resolver winding 93 to ground. The collector of transistor 70 is connected directly to ground.

With reference now to the first path which extends from potentiometer 77 to transistor 71, it is seen that the base of transistor 71 is connected to potentiometer 77 and is also connected to supply conductor 90 through resistors 76 and 83. The emitter is connected over coupling capacitor 89 and resolver winding 92 to ground and over resistors 84 and 76 to to supply path 90. The collector of transistor 71 is connected directly to ground.

Resolver windings 92 and 93 are connected to control the signal output of resolver rotor winding 94 connected over path 23 to filter 26 and over path 27 to phase error detector 43. The phase relationship of the input and output signals of resolver 96 depends on the angular position of the rotor. The angular position of the rotor 95 may be changed manually or automatically driven by servo motor 98. With the resolver rotor 95 stationary, the frequency of the output signal is the same as the input signal. If the rotor is in continuous motion, the phase angle between the two signals is continually changing and a frequency difference will exist between the resolver input and output signal. This difference in frequency in cycles per second will be the same as the angular velocity of the rotor in revolutions per second, in other words, for this configuration, 360 degrees of phase change per revolution of the rotor.

Means for further controlling the signal output include a servo motor 98 connected to resolver rotor 95 by shaft 97. Servo motor 98 is controlled by the output of servo amplifier 101 which is in turn controlled by signals received either at input 124 from an up-down counter 123 or at input 110 from manual adjust 104. Up-down counter 123 is controlled by tape-recorded time code signals received at inputs 111 and 112. A feedback network 100 is connected between servo motor 98 and servo amplifier 101 to maintain the desired control.

If the tape of a machine (i.e., a master) is used as a reference from which the tapes of all other machines (i.e., the slaves) are to be positioned, switch 102 in the machine used as a master is set in position C to connect conductor 109 to remote output 113. The tape time code signal on the tape in the master is detected by playback head 106 and conducted over paths 107, 109 and switch 102 to remote output 113. The remote output 113 is connected to conductor 103 of the up-down counter in the "slave" machines. Thus, with switch 102 on the master in position C servo amplifier 101 has no input and servo motor 98 will not turn rotor 95. If the rotor remains in the same position, positioning means 22 is inoperative, and its input signal passes unchanged, except for a possible fixed phase difference, from tape scaling circuit 8 to the frequency and phase error channels.

If the unit is used as a "slave" machine which seeks to position its tape in relation to the tape on a "master" machine, switch 102 is set in position A to connect the signals received from the master over remote input 103 to the positive (up) input of up-down counter 123, and to connect the signals received from playback head 106 over paths 107, 108 to the negative (down) input 111. Up-down counter 123 continuously provides a signal related to the difference in the number of pulses applied to the inputs and extends such signal to servo amplifier 101 which provides a signal over path 99 to drive servo motor 98 which in turn rotates rotor 95. A positive error signal produces a direction of rotation in rotor 95 opposite to that produced by a negative error signal. The amplitude of the signal determines the rate of rotation.

Positioning means 22 either raises or lowers the divided tape speed signal frequency from tape scaling circuit 8 before it enters the frequency and phase error channels depending on the direction of rotation of rotor 95. This results in an increase or decrease of the "slave" tape speed as will be explained in detail later.

Manual adjustment of the speed and direction of rotor 95 is accomplished when switch 102 is set in position B to connect manual adjust 104 to input 110 of servo amplifier 101. Manual adjust 104 may comprise any suitable means, such as a potentiometer circuit, which provides a positive or negative error signal to the servo amplifier 101 for motor 98.

Referring to FIGURE 2, the precise manner in which positioning means 22 are controlled by manual adjust 104 to increase or decrease the divided tape speed signal frequency will now be explained. It is first assumed that the tape speed signal frequency is to be increased by 20 cycles per second before the signal enters the phase and frequency error channels of the speed synchronizing circuitry.

The divided tape speed signal selected by switch 19 (FIGURE 1) is conducted over path 21 to transistor 68, which amplifies and impedance matches the signal to filter 72. Filter 72 changes the square wave signal to a sine wave of the same frequency, and extends the signal over two different paths. In the first path, the signal is amplified by transistor 71 and applied to winding 92 of resolver 96. In the second path, the signal is amplified by phase shifting transistor 69 and shifted 90 degrees in phase by capacitor 86 and potentiometer 81. The phase shifted signal is amplified by transistor 70 and applied to winding 93 of resolver 96.

Since it is desired to increase the input frequency by 20 cycles per second, rotor 95 must be turned at 20 revolutions per second by servo motor 98. Manual adjust 104 is adjusted to provide an error signal which results in operation of rotor 95 at 20 revolutions per second. At this speed, winding 94 of rotor 95 has a signal frequency 20 cycles per second higher than the tape speed signal frequency and the increased frequency signal is connected over path 23 to the frequency and phase error channels (FIGURE 1). If an error signal of an opposite polarity and like amplitude is provided by manual adjust means 104, the rotor is turned in the opposite direction and the frequency is reduced 20 cycles per second.

In either case, as the tape members move toward the desired relative positions, the manual adjust member 104 is further adjusted to decrease the error signal, such adjustment being continued until the tapes reach the desired relative positions. The adjustment of the manual adjust 104 may be facilitated by coupling the distinctive signal patterns from the "slave" tape and the corresponding patterns from the "master" tape to an oscilloscope, visually observing the patterns and adjusting the manual adjust member 104 until the signal traces are matched.

The specific manner in which the novel circuitry is operative to effect adjustment of the relative position of one of more tapes on one or more machines using the time code reference pulse is now set forth. It is first assumed that two tapes recorded simultaneously have been selected and each has been mounted on a playback machine. Further, each tape includes a channel such as channel B (FIGURE 1) on which time code pulses are recorded simultaneously with the recording of the speed reference information on channel A. In one embodiment, 1 ms. pulses were used on channel B. During playback, one machine is arbitrarily designated a "master" (i.e., machine 119, FIGURE 2) and the other machine or machines are connected as "slave" machines.

In this example, to facilitate the explanation, the machine 125 shown in FIGURE 2 is shown with its switch 102 moved to position A to operate the unit as a "slave." In such position, switch 102 connects the signal output of channel B on its associated tape 1 to input 111 and the output of channel B on the machine 119 selected as the master over input 103 to input 112 on up-down counter 123. Switch 25 (FIGURE 1) is in the upper position in the slave machines, such as 125, to connect the positioning means 22 "in circuit," and is in the lower position in the master machine 119 to disable the positioning means 22 thereat. Switch 102 on the master unit 119 is in position C to the time code output of its associated tape over its remote output conductor 113 to input 103 on each of the slaves, such as the slave 125 shown in FIGURE 2.

In use, when the "slave" and "master" machines are started, the tapes are in general not in the same relative position as during recording, and one tape will reach the beginning of its time code channel before the other. As soon as one tape begins to send time code pulses to the up-down counter, a negative or positive error voltage will be produced depending upon whether the slave tape is ahead or behind its proper position relative to the master tape. That is, with reference to FIGURE 2, and assuming the switch 102 is in the position there shown to control the unit to operate as a slave, the pulses received from the tape on the master machine are extended over conductor 103 to the "add" or "up" input 112, and the pulses received from the slave machine tape are applied to the "subtract" or "down" input 111.

In response to such pulses, counter 123 continuously provides a difference signal over conductor 124 which has a magnitude proportional to the absolute difference of the number of pulses applied to the two inputs, and a polarity dependent upon the one of the inputs which has received the larger count at the time. If, for instance, the slave tape is ahead of the desired position relative to the master tape, the counter "up" input 112 after a short period may receive, for example, 900 pulses from the master tape, and input 111 (down) may receive 1000 pulses from the slave tape. Counter 123 responsively produces a signal having an amplitude which is proportional to the 100 unit differential and a polarity to indicate that the input from the slave tape is larger (i.e., the slave tape is ahead of the master). This error signal is amplified in servo amplifier 101 and controls servo motor 98 to rotate rotor 95 through shaft 97.

As previously explained, with rotation of rotor 95, resolver 96 provides a change in frequency which is equal to the rotor speed in revolutions per second. If the error in tape position is large, the error signal from up-down counter 123 is also large and rotor 95 turns more rapidly.

In that the "slave" tape is assumed to be ahead of the "master" tape, up-down counter 123 will receive pulses from the slave tape before pulses are received from the master tape, and counter 123 produces an error signal of a polarity which results in the rotation of rotor 95 in a direction which causes positioning means 22 to increase the frequency of the divided tape speed signal before it enters the phase and frequency error channels, to thereby simulate a change in the speed of the slave tape even though the speed of the slave tape has not changed.

When positioning means 22 increases the frequency of the divided tape speed signal from tape scaling circuit 8, such increase appears to the components in the frequency and phase error channels as an increase in the "slave" tape speed. Accordingly the channels operate in the manner heretofore described to provide error signals which decrease the slave tape speed in the same manner as if tape speed actually had increased. The resulting increase in tape speed signal frequency may result in a decrease of the speed of the "slave" tape by as much as 15 percent of its normal synchronous speed while maintaining electronic synchronization.

Operation is exactly the same as was previously set forth in the speed synchronizing circuitry explanation. That is, in the phase error channel, phase error detector 43 puts out a positive D-C compoent since the phase of the tape speed signal increased in frequency by frequency changer 22 appears to lead the phase of the divided signal from crystal oscillator 64. When synchronism is achieved, the frequency error must average zero. The system is said to be frequency damped since frequency is the derivative of phase. However, the frequency channel will give a varying output as the frequency tends to change even though the system is phase locked. If the rate of change of phase induced by moving rotor 95 is within the servo response capability of the primary servo loop, then the system does not lose synchronism and the output of the frequency channel in the primary loop will still average zero from the ambient.

In the frequency error channel, frequency discriminator 53 puts out an initial error signal which leads the input signal in phase and is increased in amplitude, since the increased tape signal frequency is now higher than the reference frequency defined by the Wein bridge located in the frequency discriminator. In response to the initial error signal, chopper 52 puts out a positive D-C component which is combined with the phase error detector output in low pass filter 57 and coupled to servo amplifier 61. The resulting positive D-C signal output from servo amplifier 61 is applied to the drag disk in capstan drive 63 which decreases the "slave" tape speed. Since the "master" tape continues to operate at a synchronous speed, the "slave" tape approaches its true recorded position relative to the "master" tape every instant that its speed remains decreased (i.e., recalling that the slave was ahead of the master). As the "slave" tape nears its proper position, the difference in the number of pulses received from each tape by up-down counter 123 is decreased and counter 123 puts out a smaller error signal. Rotor 95 turns less rapidly, and the difference between the "master" and "slave" tape speeds decreases.

When the two tapes are properly positioned counter 123 will have received an equal number of pulses from both tapes and no longer puts out an error signal. The rotation of rotor 95 terminates, and the divided tape speed reference signal then passes unchanged from tape scaling circuit 8 over the positioning means 22 to the frequency and phase error channels, and the "slave" tape runs at the synchronous speed. The "master" and "slave" tapes now operate at the identical speed and position relationship at which they were recorded.

In a like manner, the system will reposition the "slave" tape if it starts out behind the "master" tape. In this case rotor 95 is rotated in a direction to decrease the divided tape speed frequency. The phase and frequency error channels then react as if the "slave" tape had actually decreased its speed, and accordingly produce a signal which causes capstan drive 63 to increase the speed of the "slave" tape until it is properly positioned.

More sophisticated time codes may be used to achieve more precise control. For instance, the tapes could carry pulses on a frequency carrier which are digitally coded to represent the hour, minutes and seconds, and the carrier being amplitude-modulated by such pulses. A digital decoder connected to receive the pulse outputs of the two tapes translates the time difference between the received codes into a bit code, and provides an on-off signal for the two units in such manner as to adjust the particular unit which is ahead to slow until the framing is fairly close to the desired value. At such time, the decoder shifts to provide an analog signal in the manner above described to bring the units into close adjustment.

This novel invention will achieve synchronous speed and position operation on any number of machines operated simultaneously. Its application is not limited to the two machines used herein to describe its operation, nor is the use of this invention limited to the specific application heretofore described. It can, for example, also vary the time delay between two rotating capstans driving the same tape or any other pair of driving or driven members. The present invention is also useful in auto and cross-correlation techniques in which rotating the frequency changer at a fixed or programmed speed variation the relative speeds of the tape at the two capstans may be varied at will.

This novel invention may be used to control the speed of the recording process in a pre-programmed manner, particularly with analogue type computers. This method of speed variation is inherently several orders of magnitude more accurate than methods which vary the speed of the capstan by varying the speed of the main motor drive by direct servo techniques since, in accordance with the teachings of this invention, a speed difference from a fixed speed rather than an absolute value of speed is employed, and the fixed speed may be controlled from an accurate crystal oscillator.

While what is described is regarded to be a preferred embodiment of the invention, it will be apparent that variations, rearrangements, modifications and changes may be made therein without departing from the scope of the present invention as defined by the appended claims.

What is claimed is:

1. In a system for establishing a predetermined speed for a driven member and a predetermined position of said driven member relative to a reference position on a second moving member, input means for providing input signals representative of the speed of the driven member, control means responsive to said input signals for providing a speed error signal having a value indicating a variation of the speed of said driven member from said predetermined speed, means controlled by said error signal to drive said member at said predetermined speed, and positioning means including means for indicating a predetermined position of said driven member relative to said reference position on said moving member, and signal means for providing a position error signal concurrently with said input signals to said control means to simulate a change in speed of said driven member by an amount related to said position error signal.

2. A system as set forth in claim 1 in which said second moving member provides a position reference signal which comprises a first time code signal and said driven member includes means for providing a second time code signal representative of the position of said driven member, and in which said signal means is connected to provide an error signal related to the difference in the positions represented by said first and second time code signals.

3. A system as set forth in claim 1 which includes manually adjustable means for providing a position reference signal to said signal means to indicate the amount of deviation of the position of the driven member from said reference position on said second moving member.

4. A system as set forth in claim 1 in which said input means includes means for providing an input signal having a frequency related to the speed of said driven member, and in which said signal means includes means for changing the value of said frequency by a value related to the variation in reference position of said driven member from said reference position on said second moving member.

5. A system as set forth in claim 1 in which said control means includes means for providing an output signal related to the deviation of phase and frequency of the signals which represent the speed of said driven member from predetermined references, and in which said signal means includes means for changing the value of said output signal by a value related to the position error signal.

6. A system as set forth in claim 1 which includes input means for providing a signal to said control means having a frequency related to the speed of said driven member, and in which said control means includes means for providing a speed error signal related to the deviation of said frequency relative to a predetermined value, and in which said signal means in said positioning means changes at least the frequency of said input signal to simulate a change in the speed of said driven member.

7. In a system for establishing a predetermined speed for a first driven member and a predetermined position of said first member with a reference position on a second driven member, input means for providing a first signal indicating the speed of said first driven member, control means for providing a speed error signal having a value indicating the amount of variation of the indicated speed of said member from said predetermined speed, means controlled by said speed error signal to drive said first driven member at said predetermined speed, and positioning means including means for providing a position error signal related to the difference in said predetermined position of said one member relative to the reference position on said second driven member, and means for coupling said position error signal with said first signal to said control means to simulate a speed change of said first driven member.

8. In a system for establishing a predetermined speed for a first driven member and a predetermined position of said first member with a second driven member, means for providing a first signal indicating the speed of said first member, control means for providing a speed error signal having a value indicating a variation of the indicated speed of said first member from said predetermined speed, means controlled by said speed error signal to drive said first member at said predetermined speed, and positioning means including signal means for providing an error signal indicating the position of said one member relative to said second driven member, and means for providing a position error signal with said first signal to said control means to simulate a change in speed to said control means by an amount related to said position error signal including a frequency changer means for providing an output signal having a frequency related to the value of said position error signal and said first signal comprising a servo resolver device having control windings, a rotor, means for driving said rotor at a speed related to said error signal, means for connecting signals related to the actual speed of said first member to said control windings, and output means for coupling the combined signals to said control means to simulate a change in speed of said first driven member.

9. In a system for establishing a predetermined speed for a first driven tape member and a predetermined position of said first tape member with a given reference position on a moving member, said first tape member having frequency signals recorded thereon, control means including input means for detecting said tape recorded frequency signals to obtain a speed indication for said tape, and means for providing a speed error signal having a value indicating a variation of the indicated speed of said driven tape member from said predetermined speed, positioning means including signal means for providing an error signal indicating the position of said driven tape member relative to said given reference position on said second moving member, and signal means for at times combining said detected frequency signal and said position error signal to obtain a resultant signal having a frequency of a value which simulates a change in speed of said first tape member, and means for coupling said resultant signal to said control means.

10. In a system for establishing a predetermined speed for a driven member and a predetermined position of said member with a reference position on a second moving member, a first means for providing a frequency signal having a value which indicates the actual speed of said driven member, control means for providing a speed error signal related to the value of said frequency signal, the value of said speed error signal increasing with an increase in the speed of said driven member relative to said predetermined speed, means controlled by an error signal of increased value to drive said member at a reduced speed, and positioning means including means for providing a position error signal having a frequency of an increased value to indicate advance of the predetermined position of said driven member ahead of said reference position on said second moving member, and signal means for coupling said position error signal of increased value to said control means with the signal output of said first means to simulate an increased speed of said driven member.

11. In a system for establishing a predetermined speed for a driven member and a predetermined position of said member with a reference position of a second moving member, including a first means for providing a frequency signal having a value which indicates the actual speed of said driven member, control means for providing a speed error signal related to the value of said frequency signal, the value of said speed error signal decreasing with a decrease in the speed of said driven member relative to said predetermined speed, means controlled by a signal of decreased value to drive said driven member at an increased speed, and positioning means including means for providing a position error signal having a frequency of a decreased value to indicate lag of said driven member behind said reference position on said second moving member, and signal means for coupling said position error signal of decreased value to said control means with the signal output of said first means to simulate a decreased speed of said driven member.

12. In a system for establishing a predetermined speed for a first driven tape member in a slave recorder device and a predetermined position of said first tape member with a second driven tape member in a master recorder device, means including recorded signals on said first tape member for providing signals indicating the speed of said first tape member, control means in said slave recorder device at least for providing a speed error signal having a value indicating a variation of the speed of said first tape member from said predetermined speed, including means controlled by said speed error signal to drive said first tape member at said predetermined speed, means including signals on said first and second tape member for providing signals indicating the relative position of said first and second tape members, and positioning means for said slave recorder device including means for providing an error signal indicating a difference in the position of said first tape member relative to said second tape member, and means for coupling said error signal to said control means for said slave recorder device to simulate a change in speed of said first driven member by an amount related to said error signal to thereby cause said control means to change the speed of said first tape member to bring the tapes back into said predetermined relative position.

13. In a system for establishing a predetermined speed for a first driven tape member in a first recorder device and a predetermined position of said first tape member with a second driven tape member in a second recorder device, input means for providing a first signal having a value indicating the speed of said first tape member, control means in said first device at least including means for comparing said first signal with a predetermined reference to detect variations from said predetermined speed, means for providing a speed error signal proportional to said variation, and means controlled by said speed error signal to drive said first member at said predetermined speed, and positioning means for said first device including means for providing a position error signal indicating the difference in the position of said first tape member relative to said second tape member, means for coupling said position error signal and said first signal to said control means to simulate a change in speed of said first tape member, and switch means having a first position for coupling said input means to said control means in by-pass relation to said positioning means, and a second position for coupling said input means to said positioning means.

14. A system as set forth in claim 13 in which each of said tape members has a plurality of time code pulses recorded thereon, and in which said second recorder device includes means operative to provide a plurality of time code pulses over an output circuit indicating the position of its tape, and in which said first recorder device includes comparison means having means for receiving said time code pulses from said second tape, and said time code pulses from said first tape, and means for providing a signal related to the difference in count of said pulses.

15. In a system for establishing a predetermined speed for a driven member and a predetermined position of said member with a reference position including reference means for providing a first signal having a frequency which indicates the actual speed of said driven member, control means including a passive Wein bridge element for establishing a predetermined frequency value, and means for providing a speed error signal having a value proportional to the difference in frequency of said signal and said predetermined frequency, drive means controlled by said speed error signal to drive said member at said predetermined speed, and positioning means including means for providing a second signal having a frequency of a value to indicate variation of the position of the driven member to said reference position, and means for extending said first and second signals to said control means to simulate a different speed for said driven member.

16. In a system for establishing a predetermined speed for a driven member and a predetermined position of said member with a reference position on a second moving member including reference means for providing a first signal having a frequency and phase which indicates the actual speed of said driven member, control means including means for establishing a predetermined frequency reference value, means for establishing a predetermined reference phase, and means for providing a speed error signal having a value proportional to the difference in value of the frequency and phase of said first signal relative to said reference values, and drive means for said driven member controlled by said speed error signal to drive said member at said predetermined speed, and positioning means including means for providing a second signal having a frequency and phase of a value to indicate variation of the position of the driven member relative to said reference position on said second moving member, and means for modifying said first signal by said second signal to simulate a different speed for said driven member and thereby effect a corresponding change in the speed error signal output by said control means.

References Cited

UNITED STATES PATENTS

| | | | |
|---|---|---|---|
| 3,016,428 | 1/1962 | Kabell et al. | 318—314 X |
| 3,268,788 | 8/1966 | Branco | 318—314 |
| 3,295,032 | 12/1966 | Branco | 318—314 X |

ORIS L. RADER, *Primary Examiner.*

J. J. BAKER, *Assistant Examiner.*